US008682251B2

(12) United States Patent
Das et al.

(10) Patent No.: US 8,682,251 B2
(45) Date of Patent: Mar. 25, 2014

(54) APPARATUS AND METHODS FOR ESTIMATION OF A SUBCHANNEL POWER IMBALANCE RATIO (SCPIR)

(75) Inventors: Sajal Kumar Das, Bangalore (IN); Aravindh Krishnamoorthy, Bangalore (IN); Leela Srikar Muppirisetty, Andhra Pradesh (IN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 364 days.

(21) Appl. No.: 13/099,777

(22) Filed: May 3, 2011

(65) Prior Publication Data

US 2012/0244817 A1      Sep. 27, 2012

(30) Foreign Application Priority Data

Mar. 21, 2011 (IN) .............................. 781/DEL/2011

(51) Int. Cl.

| H04B 1/00 | (2006.01) |
|---|---|
| H04B 15/00 | (2006.01) |
| H04B 17/00 | (2006.01) |
| H04B 3/46 | (2006.01) |
| H04Q 1/20 | (2006.01) |
| H03D 1/06 | (2006.01) |
| H03D 11/04 | (2006.01) |
| H03K 5/01 | (2006.01) |
| H03K 6/04 | (2006.01) |

(52) U.S. Cl.
USPC .................. 455/63.1; 455/67.11; 455/226.1; 375/227; 375/348

(58) Field of Classification Search
USPC ........... 455/63.1, 67.11, 67.13, 226; 375/227, 375/346, 348
See application file for complete search history.

(56) References Cited

U.S. PATENT DOCUMENTS

| 5,293,401 | A  | * | 3/1994 | Serfaty ........................ 375/231 |
|---|---|---|---|---|
| 6,952,570 | B2 | * | 10/2005 | Nagayasu .................... 455/208 |
| 2004/0032917 | A1 | * | 2/2004 | Hwang et al. ................ 375/343 |
| 2005/0111538 | A1 | * | 5/2005 | Wernaers ..................... 375/229 |
| 2006/0062334 | A1 | * | 3/2006 | Kang ............................ 375/340 |
| 2009/0264088 | A1 | * | 10/2009 | Li et al. ...................... 455/114.2 |
| 2010/0279701 | A1 | * | 11/2010 | Chen .......................... 455/452.2 |
| 2011/0082689 | A1 | * | 4/2011 | Juncker et al. ............... 704/201 |
| 2011/0159831 | A1 | * | 6/2011 | Jiang .......................... 455/226.3 |
| 2012/0155452 | A1 | * | 6/2012 | Aoki et al. ................... 370/345 |
| 2012/0220292 | A1 | * | 8/2012 | Yu et al. ....................... 455/424 |

OTHER PUBLICATIONS

Lei, H., et al., "Subchannel Interference Cancellation for GERAN/VAMOS Systems", IEEE International Conference on Communications Technology and Applications, Proceedings of ICCTA '09, Oct. 16, 2009, pp. 157-161, XP031577575.
Meyer, R., et al., "Efficient Receivers for GSM MUROS Downlink Transmission", IEEE 20th International Symposium on Personal, Indoor and Mobile Radio Communications, PIMRC 2009, Sep. 13, 2009, pp. 2399-2403, XP031659888.
International Search Report issued in PCT application No. PCT/EP2012/054680 on Jun. 15, 2012, 4 pages.
International Preliminary Report on Patentability and Written Opinion of the International Seaching Authority issued in PCT application No. PCT/EP2012/054680 on Oct. 3, 2013, 6 pages.

* cited by examiner

*Primary Examiner* — Andrew Wendell
(74) *Attorney, Agent, or Firm* — Rothwell, Figg, Ernst & Manbeck, P.C.

(57) ABSTRACT

Described herein are various methods for a communication device (e.g., a mobile station) receiving an AQPSK modulated signal (e.g., a VAMOS signal) to estimate a subchannel power imbalance ratio (SCPIR). Advantageously, the methods are not computationally complex and do not suffer from poor numerical performance.

20 Claims, 8 Drawing Sheets

APPARATUS AND METHODS FOR ESTIMATION OF A SUBCHANNEL POWER IMBALANCE RATIO (SCPIR)

TECHNICAL FIELD

The invention relates to methods for estimating a subchannel power imbalance ratio (SCPIR).

BACKGROUND

The Global System for Mobile communication (GSM) is a popular communication system having more than 3 Billion subscribers world-wide. Each year there is a significant increase in the number of GSM subscribers, especially in China and India, where subscriber density is very high. Supporting a large number of simultaneous voice calls is problematic for GSM operators. As subscriber growth increases, especially in areas having a high population density, this problem will become more frequent. Accordingly, solutions have been devised to increase the capacity of GSM networks.

One recent initiative to increase the capacity of GSM networks is known as Voice Services over Adaptive Multi-user channels on One Slot (VAMOS). VAMOS can double system capacity and help optimize spectrum efficiency and usage of scarce radio resource, while reducing radio base station power consumption. That is, VAMOS doubles the number of users served by a single radio resource.

In VAMOS, the network assigns the same physical channel (frequency (f) and time-slot (T)) to two different mobile stations (e.g., MS1 and MS2). Therefore, in the downlink, the network assigns the same physical resources (e.g. frequency/time-slot combination) to two different mobile stations, but allocates to each mobile station one of a pair of a training sequences for their respective channel estimation, thereby doubling the system capacity in case of Traffic channels. The training sequence pair is known a priori to both the mobile stations. The network decides to which of the pair of mobile stations higher transmit power should be allocated based on, for example, the near-far position of paired mobile stations and uses the Adaptive Quadrature Phase Shift Keying (AQPSK) modulation technique to introduce power imbalance between the two paired mobiles stations.

Thus, in VAMOS, to achieve the doubling of the system capacity, co-channel interference is introduced intentionally. Before decoding, each mobile station therefore has to use an interference cancellation technique to reject the signal energy corresponding to the signal intended for the other mobile station from the received AQPSK modulated signal. But, for better receiver performance, prior to applying the interference rejection technique, the mobile stations needs to detect the power imbalance introduced by the network.

What is desired, therefore, are methods for use in a receiver for detecting this power imbalance.

SUMMARY

Described herein are various methods for a communication device (e.g., a mobile station) receiving a single carrier signal on which two bit streams (i.e., a first bit stream intended for a first communication device and a second bit stream intended for a second communication device) are modulated to detect the power imbalance between the two bit streams (i.e., subchannels) and, thereby, estimate the subchannel power imbalance ratio (SCPIR). Advantageously, the methods are not computationally complex and do not suffer from poor numerical performance. The two bit streams may be modulated on the single carrier signal using the AQPSK modulation technique to produce, for example, a VAMOS signal.

In some embodiments, the method helps determine the sign of the SCPIR, which helps in equalization and detection. In these embodiments, a received VAMOS signal is projected to the space spanned by a pair of training sequences included in the VAMOS signal. The ratio of the two parameters produced during the projection gives an estimate of the sign of the SCPIR. In some particular embodiments, the received VAMOS signal is projected to the joint vector space spanned by the training sequences, whereas in other particular embodiments, we assume the vector spaces to be orthogonal, which assumption leads to a slightly less computationally complex method. The process of parameter estimation for these methods may be seen as taking a dot product (inner product) of the received VAMOS signal and users' original training sequences.

In other embodiments, the methods help determine SCPIR and use a statistical estimation technique to determine the parameters associated with each sub-channel instead of the inner product. Reasonable number of parameters that must be estimated per sub-channel is 3 to 7.

The choice of which method to employ is a trade-off between implementation complexity and performance.

Accordingly, in one particular aspect, a method performed by a communication device for estimating a subchannel power imbalance ratio (SCPIR) between a pair of AQPSK subchannels consisting of a first subchannel and a second subchannel is provided. In some embodiments, this method begins with the step of receiving, at the communication device, an AQPSK modulated signal, where the AQPSK modulated signal includes a first signal intended for the communication device and a second signal intended for another communication device, and the first signal includes a first training sequence (TS1) and the second signal includes a second training sequence (TS2) that is paired with TS1. Next, the communication device produces from the received AQPSK modulated signal a sample sequence (r). The communication device then (a) uses TS1 and r to estimate a channel impulse response of length K (K is greater than or equal to 1) for the first subchannel (let $h_1$ denote the estimated channel impulse response for the first subchannel) and (b) uses TS2 and r to estimate a channel impulse response of length K for the second subchannel (let $h_2$ denote the estimated channel impulse response for the second subchannel). Next, the communication device estimates the SCPIR from $h_1$ and $h_2$.

In some embodiments, K is equal to 1. In these embodiments, the step of determining $h_1$ comprises determining a dot product of r and TS1, where $c_1$ denotes the determined dot product, and the step of determining $h_2$ comprises determining a dot product of the r and TS2, where $c_2$ denotes the determined dot product. For example, $c_1$ may determined using the following equation:

$$c_1 = \sum_{k=0}^{N-1} a_1^*[k] r[k],$$

and $c_2$ may be determined using the following equation:

$$c_2 = \sum_{k=0}^{N-1} a_2^*[k] r[k],$$

where $a_1$ represents TS1, $a_2$ represents TS2, $r[k]$ is the kth value of sequence r, and N is the length of the TS1, which is equal to the length of TS2. In some embodiments where K=1, $h_1$ and $h_2$ are determined using the following equation:

$$\begin{bmatrix} h_1 \\ h_2 \end{bmatrix} = D \begin{bmatrix} c_1 \\ c_2 \end{bmatrix},$$

where D is a matrix that allows combined energy estimation for the two subchannels. In other embodiments, where K=1, $h_1$ and $h_2$ are determined using the following equations, respectively:

$$h_1 = \frac{c_1}{\sum_{k=0}^{N-1} |a_1[k]|^2}$$

and $$h_2 = \frac{c_2}{\sum_{k=0}^{N-1} |a_2[k]|^2}$$

In some embodiments, the step of estimating the SCPIR comprises determining a ratio of h1 and h2. In other embodiments, the step of estimating the SCPIR includes the following steps: (a) setting an initial estimate of the SCPIR to 20 log 10 of ratio of |h1| and |h2|, (b) determining whether the value of the initial estimate of the SCPIR is equal to a valid SCPIR value, and (c) if it is determined that the initial estimate of the SCPIR is not equal to a valid SCPIR value, then determining the valid SCPIR value that is closest in value to the initial estimate and choosing this valid SCPIR value as the estimate of the SCPIR.

In some embodiments K is greater than 1 and $h_1$ is a column vector having a length of K and $h_2$ is a column vector having a length of K. In these embodiments, the step of estimating the SCPIR comprises setting an initial estimate of the SCPIR equal to $$20 \log 10 \frac{1}{K} \sum_{k=0}^{K-1} |h_1[k]|/|h_2[k]|.$$

In the embodiments where K>1, $h_1$ and $h_2$ may be determined using the following equation:

$$\begin{bmatrix} h_1 \\ h_2 \end{bmatrix} = A \; r,$$

where $A = ([A_1|A_2]^H [A_1|A_2])^{-1} [A_1|A_2]^H$. In other embodiment where K>1, $h_1$ and $h_2$ may be determined using the following equations, respectively: $h_1 = ((A_1^H A_1)^{-1} A_1^H) r$, and $h_2 = ((A_2^H A_2)^{-1} A_2^H) r$. In still other embodiments where K>1, $h_1$ and $h_2$ may be determined using the following equations, respectively: $h_1 = ((A_1^A A_1)^{-1} A_1^H) r$, and $h_2 = ((A_2^H A_2)^{-1} A_2^H)(r - (A_1 h_1))$.

In another particular aspect, an improved communication device is provided. In some embodiments, the improved communication device includes: (a) an RF module for receiving a carrier signal on which two bit streams, a first bit stream intended for the communication device and a second bit stream intended for another communication device, are modulated and for producing a sample sequence (r) from the received carrier signal; and (b) a subchannel power imbalance ratio (SCPIR) estimator for estimating a ratio of the power used to transmit the first bit stream and the power used to transmit the second bit stream. The first bit stream includes a first training sequence (TS1) and the second bit stream includes a second training sequence (TS2) that is paired with TS1. In some embodiments, the SCPIR estimator is configured to: (a) use TS1 and r to estimate a channel impulse response of length K for a first subchannel, where $h_1$ denotes the estimated channel impulse response for the first subchannel and K is greater than or equal to 1; (b) use TS2 and r to estimate a channel impulse response of length K for a second subchannel, where $h_2$ denotes the estimated channel impulse response for the second subchannel; and (c) estimate the ratio from $h_1$ and $h_2$.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
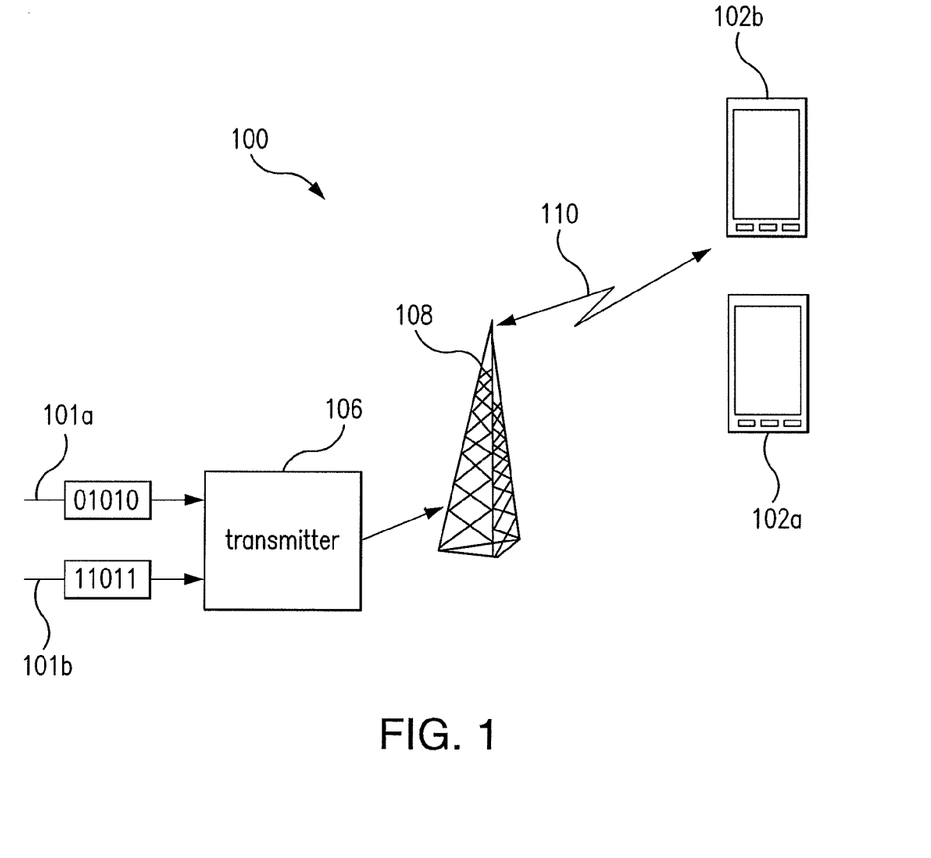
FIG. 1 illustrates a communication system according to an embodiment.

Referring now to FIG. 1, FIG. 1 illustrates a communication system 100 according to an embodiment. In this example, we will assume communication system 100 is part of a GSM system and that two VAMOS communication devices (communication device 102a and communication device 102b) are served by a single VAMOS signal 110 transmitted using a base station antenna 108. That is devices 102a and 102b form a VAMOS pair. FIG. 1 shows two bit streams (101a and 101b) and we shall assume that bit stream 101a is intended for communication device 102a and bit stream 101b is intended for communication device 102b. In this example, the two bit streams 101a,b are AQPSK modulated on a single carrier by transmitter 106 to produce VAMOS signal 110, which is then transmitted using base station antenna 108.

As described above, the multiplexing of the two bit streams causes a high level of interference at the input of each communication device 102. Thus, each communication device 102 requires a robust interference mitigation algorithm for equalization and detection of the bit stream intended for the device. Several such algorithms have been proposed, such as: Successive Interference Cancellation (SIC), Single Antenna MIMO, and Joint Detection (JD). Each of these algorithms requires an estimation of the SCPIR for effective interference mitigation.

Figure 2:
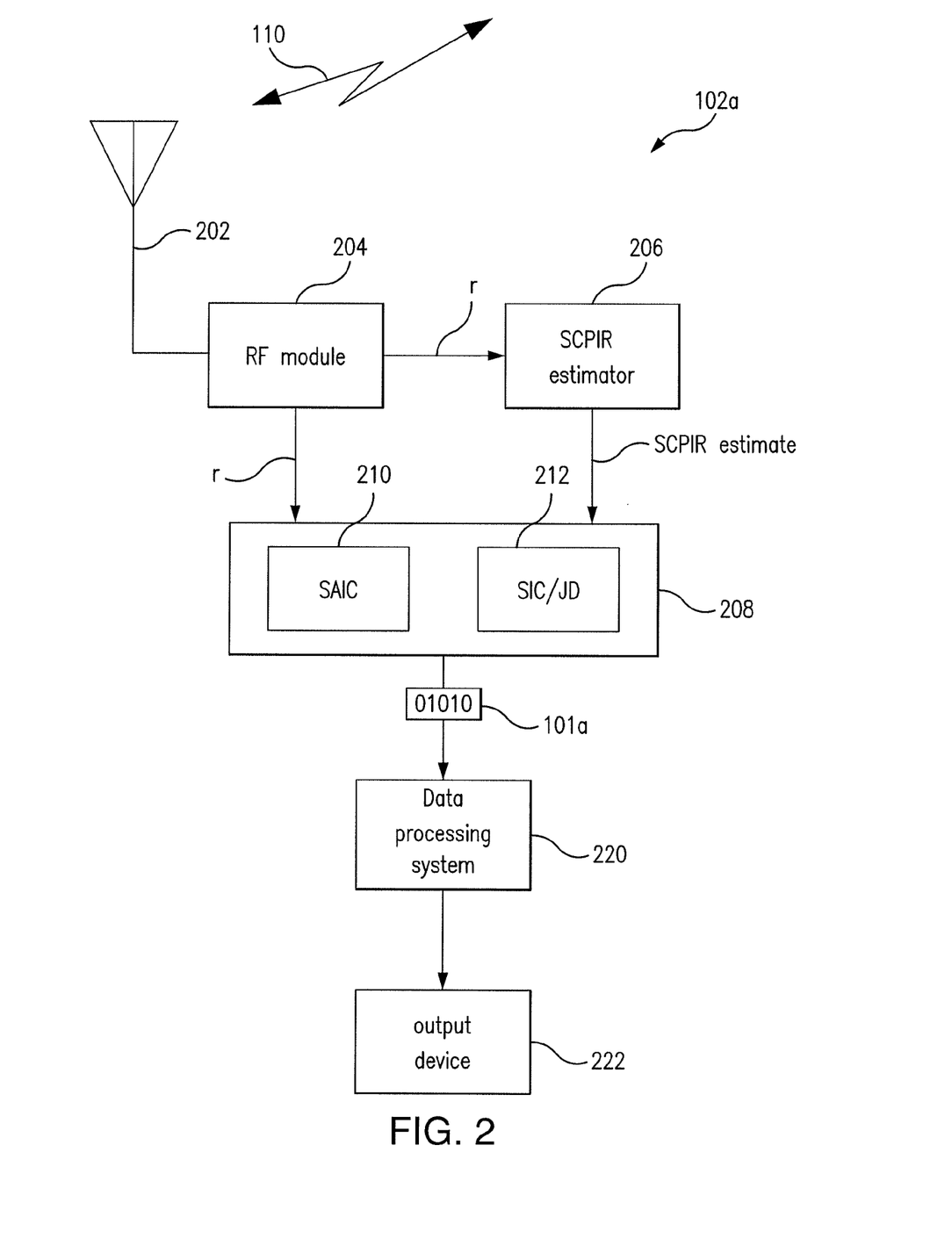
FIG. 2 is a functional diagram of a particular embodiment of a communication device.

Referring now to FIG. 2, FIG. 2 is a functional diagram of a particular embodiment of communication device 102a. Communication device 102a includes an antenna 202 for receiving VAMOS signal 110, an RF module 204 coupled to antenna 202 for producing a sample sequence (r) from the received signal 110, an SCPIR estimator 206 coupled to RF module 204 for receiving r and for estimating an SCPIR, and a receiver unit 208 coupled to RF module 204 and SCPIR estimator 206. Receiver unit 208 receives r and an SCPIR estimate from SCPIR estimator 206. Based on the SCPIR estimate, receiver unit 208 may select a receiver module to process r to reproduce the transmitted bit stream, which may be further processed by data processing system 220 coupled to an output device (e.g., speaker, display, or other output device). For example, if the SCPIR is a positive value, then receiver unit 208 may select a legacy Single Antenna Interference Cancellation (SAIC) receiver module 210 to detect the bit stream intended for device 102a, whereas if the SCPIR is a negative value, then receiver unit 208 may select a SIC or JD receiver module 212 to detect the bit stream.

Figure 3:
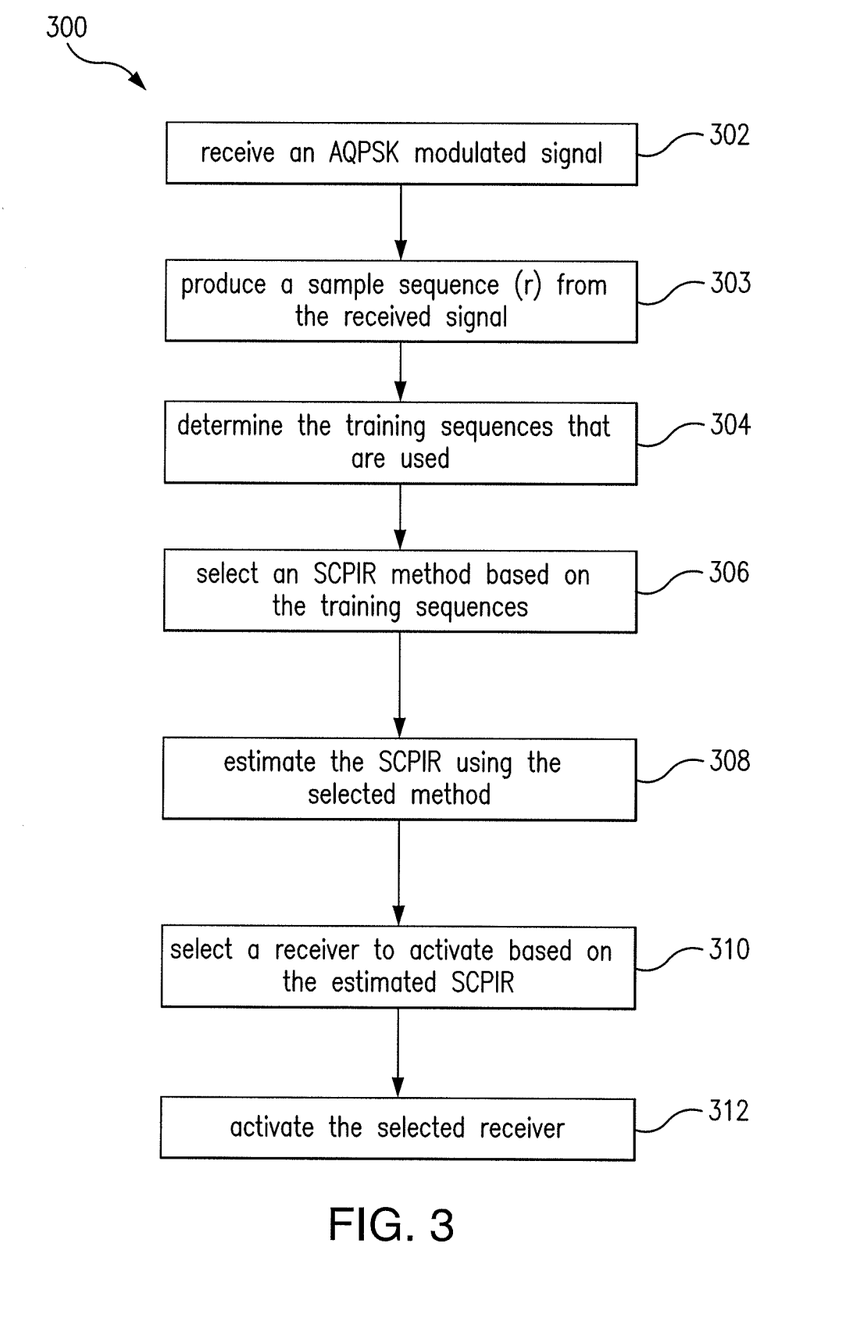
FIGS. 3-6 are flow charts illustrating various processes according to particular embodiments.

Referring now to FIG. 3, FIG. 3 is a flow chart illustrating a process 300, according to some embodiments, that is performed by a communication device 102 (e.g., communication device 102a).

Process 300 may begin in step 302, where the communication device 102a receives a carrier signal on which two bit streams are modulated. We shall assume that communication device 102 receives VAMOS signal 110. As described above, bit stream 101a and bit stream 101b are AQPSK modulated on a carrier to produce VAMOS signal 110.

In step 303, communication device 102a receives VAMOS signal 110 and produces therefrom a sample sequence (r).

In step 304, communication device 102a determines the training sequence included in bit stream 101a ("TS1") and the training sequence included in bit stream 101b ("TS2"). This information may have been signaled to communication device 102a before the base station antenna 108 transmitted signal 110.

In step 306, the communication device 102a selects an SCPIR estimation method based on the training sequence pair included in VAMOS signal 110. For example, SCPIR estimator 206 may be operable to perform a number of different SCPIR estimation algorithms and may be configured to select which of these algorithms to use based on which training sequence pair is being used and other system constraints. In some environments there is a limited number of possible training sequence pairs (e.g., 8 pairs) and each pair within this limited set has a different degree of orthogonality (i.e., some training sequence pairs are more orthogonal than others).

In step 308, the selected SCPIR estimation method is performed to produce an SCPIR estimate. In step 310, communication device 102a may, based on the SCPIR estimate, select a receiver module to use to further process the received data. For example, as discussed above, if the SCPIR estimate is a positive value, then communication device 102a may select the legacy SAIC receiver module 210, otherwise it may select the SIC or JD receiver module 212. In step 312, the selected receiver module is activated and processes the received data.

Figure 4:
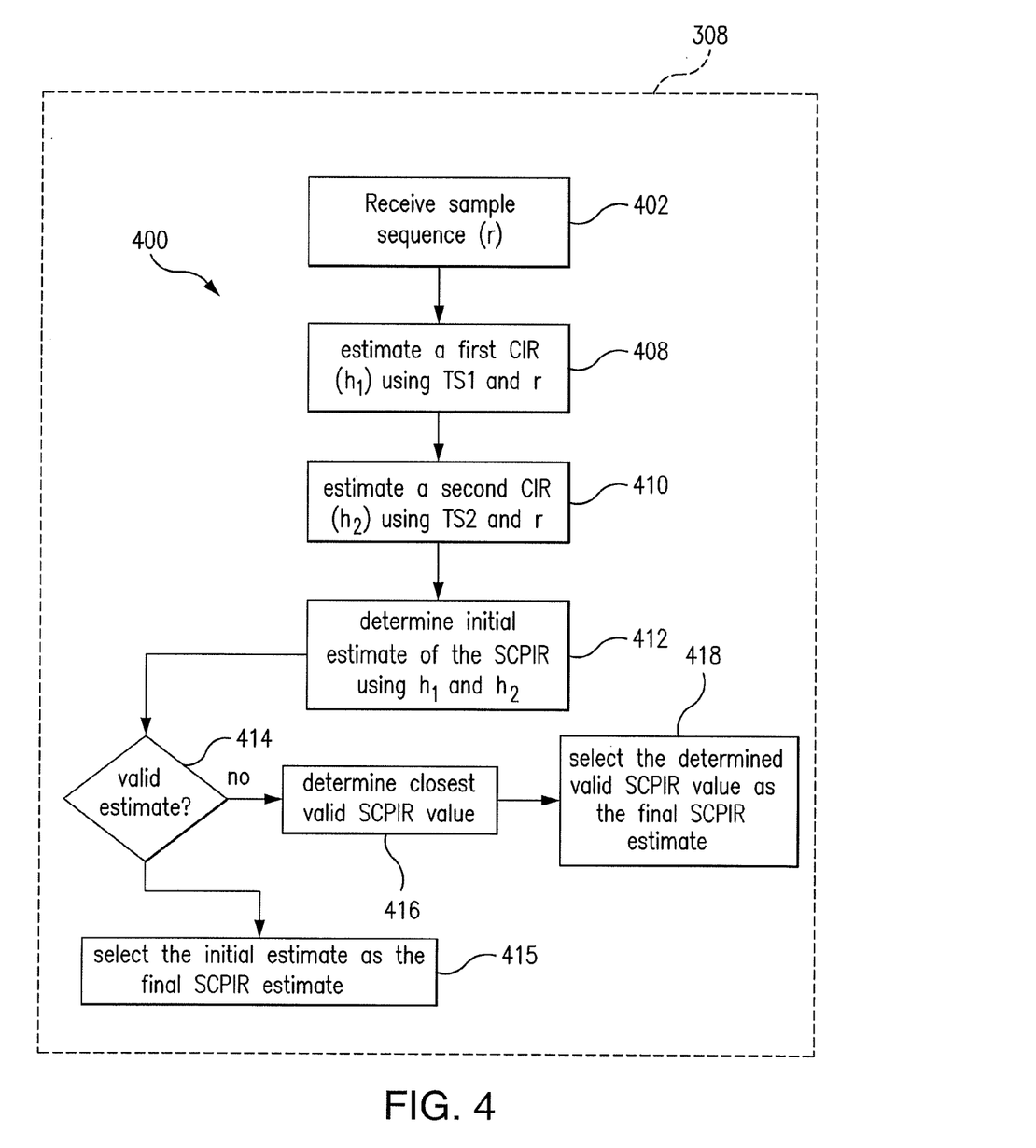

Referring now to FIG. 4, FIG. 4 is flow chart illustrating a process 400 for performing step 308 (i.e., the step in which an estimate of the SCPIR is generated). Process 400 may be performed by SCPIR estimator 206 of communication device 102a.

Process 400 may begin in step 402, where SCPIR estimator 206 receives from RF module 204 the sample sequence r. In step 408, SCPIR estimator 206 estimates a first channel impulse response ($h_1$) using TS1 and r, where TS1 is the training sequence included in bit stream 101a (i.e., the bit stream intended for communication device 102a). In step 410, estimator 206 estimates a second channel impulse response ($h_2$) using TS2 and r, where TS2 is the training sequence included in bit stream 101b (i.e., the bit stream intended for communication device 102b). In some embodiments, SCPIR estimator 206 maintains in a data storage system its own copy of each possible training sequence pair and transmitter 106 identifies to SCPIR estimator 206 the training sequences that are included in the bit streams modulated on the VAMOS signal 110.

In step 412, SCPIR estimator 206 determines an initial estimate of the SCPIR using $h_1$ and $h_2$. In step 414, SCPIR estimator 206 determines whether the initial estimate of the SCPIR is a valid value. In some embodiments, there exists a predefined set of valid SCPIR values (e.g., −10 dB, −8 dB, −4 dB, 0 dB, and 4 dB). Thus, in these embodiments, SCPIR estimator stores all of the valid SCPIR values and determines whether the initial SCPIR estimate is included in this set of stored valid SCPIR values. If the initial SCPIR estimate is included in the set of valid SCPIR values, the SCPIR estimator 206 selects the initial SCPIR estimate as the final estimate (step 415). Otherwise, SCPIR estimator 206 determines which of the valid SCPIR values is closest to the initial estimate (step 416) and then selects the valid SCPIR value determined in step 416 as the final SCPIR estimate (step 418).

The received VAMOS signal 110 may be modeled as follows:

$$r[n] = \sum_{k=-\infty}^{+\infty} \tilde{h}[k]\left\{\frac{\beta}{\sqrt{2}}a_1[n-k] + j\sqrt{\frac{2-\beta^2}{2}}a_2[n-k]\right\} + v[n] + w[n] \quad \text{(eq. 1)}$$

where $\tilde{h}$ is the channel impulse response (CIR) excluding AQPSK gain, $a_1$ is the training sequence (in NRZ form) of the first user (first sub-channel) (e.g., TS1), $a_2$ is the training sequence (in NRZ form) of the second user (second sub-channel) (e.g., TS2), v is the interference, and w is Additive White Gaussian Noise (AWGN). The quantity $\beta$ determines the power imbalance in the sub-channels. SCPIR in dB ($\alpha$) is defined in terms of $\beta$ as follows:

$$SCPIR\alpha = 10\log_{10}\left(\frac{\beta^2}{2-\beta^2}\right). \quad \text{(eq. 2)}$$

Eq. 1 can be rewritten in terms of matrices as follows:

$$r = A_1 h + jLA_2 h + v + w \quad \text{(eq. 3), where:}$$

$A_1$ is the toeplitz matrix of first user's training sequence;
$A_2$ is the matrix of second user's training sequence having K linearly independent columns, where K is the length of the channel impulse response (the matrices $A_1$ and $A_2$ can be constructed as follows:

$$A_1 = \begin{bmatrix} a_1[K-1] & a_1[K-2] & \cdots & a_1[0] \\ a_1[K] & a_1[K-1] & \cdots & a_1[1] \\ \vdots & \vdots & \ddots & \vdots \\ a_1[N-1] & a_1[N-2] & & a_1[N-K] \end{bmatrix}$$

$$A_2 = \begin{bmatrix} a_2[K-1] & a_2[K-2] & \cdots & a_2[0] \\ a_2[K] & a_2[K-1] & \cdots & a_2[1] \\ \vdots & \vdots & \ddots & \vdots \\ a_2[N-1] & a_2[N-2] & & a_2[N-K] \end{bmatrix};$$

h is a CIR, e.g., h is a column vector storing CIR parameters $$h = \begin{bmatrix} \beta \tilde{h}[k] \\ \sqrt{2} \end{bmatrix}$$

and v and w are column vectors of interference and AWGN respectively. SCPIR is related to b as follows:

$$\alpha = 20 \log_{10}\left(\frac{1}{b}\right).$$

Figure 5:
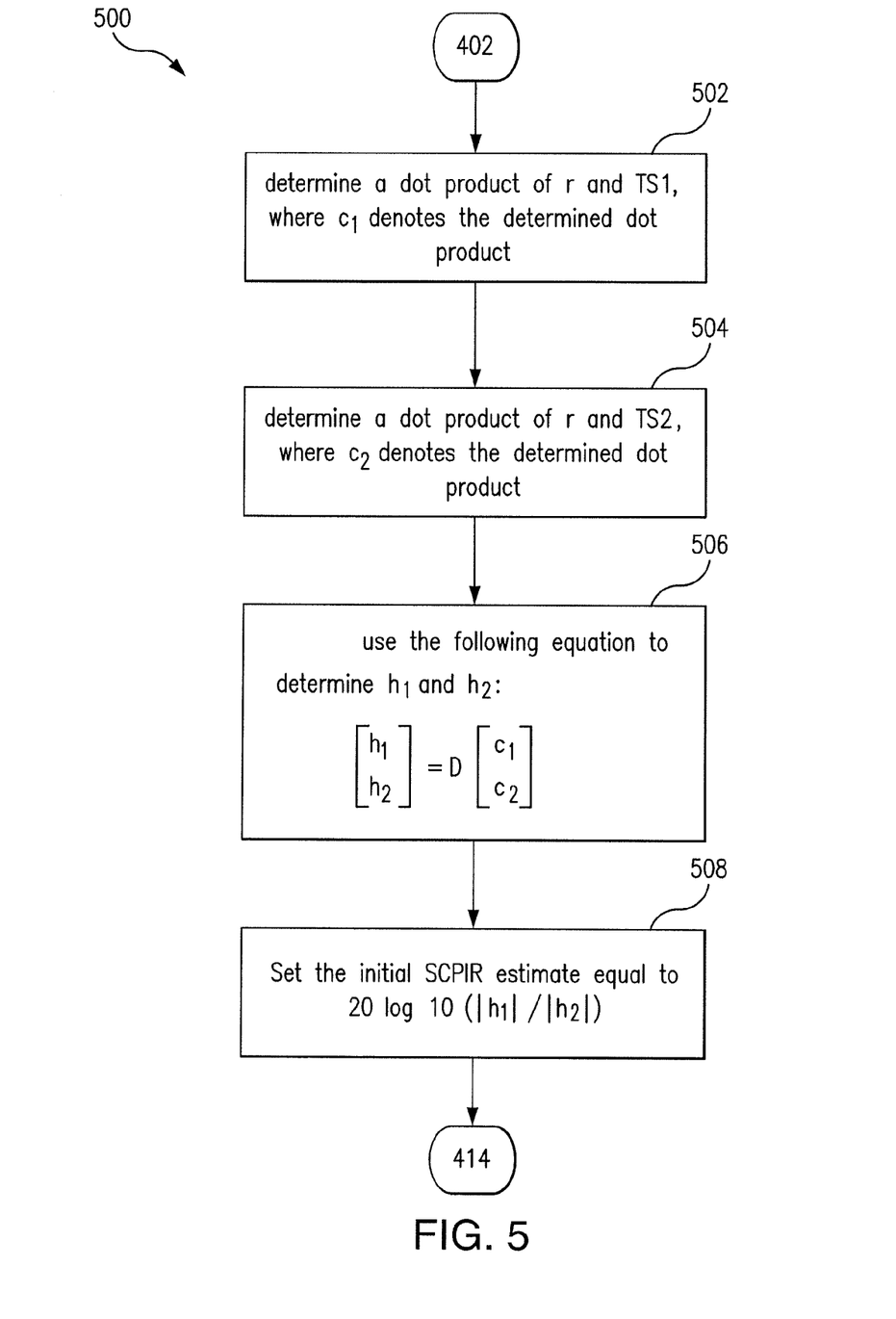

Referring now to FIG. 5, FIG. 5 is a flow chart illustrating a process 500, according to one embodiment, for performing steps 408-412 of process 400. Process 500 may begin in step 502, where SCPIR estimator 206 determines a dot product of r and TS1, where $c_1$ denotes the determined dot product. For example, in step 502, SCPIR estimator 206 sets $c_1$ equal to $$\sum_{k=0}^{N-1} a_1^*[k] r[k].$$

In step 504, SCPIR estimator 206 determines a dot product of r and TS2, where $c_2$ denotes the determined dot product. For example, in step 504, SCPIR estimator 206 sets $c_2$ equal to $$\sum_{k=0}^{N-1} a_2^*[k] r[k].$$

r[k] is the kth value of sequence r, and N is the length of the TS1, which is equal to the length of TS2.

In step 506, SCPIR estimator 206 uses the following equation to determine $h_1$ and $h_2$:

$$\begin{bmatrix} h_1 \\ h_2 \end{bmatrix} = D \begin{bmatrix} c_1 \\ c_2 \end{bmatrix},$$

where D is a matrix that allows combined energy estimation for the two subchannels.

For example, D can be computed using Least Square or oblique projection based method that allows combined energy estimation for communication devices 102a and 102b. For instance, in some embodiments:

$$D = \begin{bmatrix} \sum_{k=0}^{N-1} |a_1[k]|^2 & \sum_{k=0}^{N-1} a_2^*[k] a_1[k] \\ \sum_{k=0}^{N-1} a_1^*[k] a_2[k] & \sum_{k=0}^{N-1} |a_2[k]|^2 \end{bmatrix}^{-1}.$$

In step 508, SCPIR estimator 206 sets the initial SCPIR estimate equal to: $20 \log 10(|h_1|/|h_2|)$.

Figure 6:
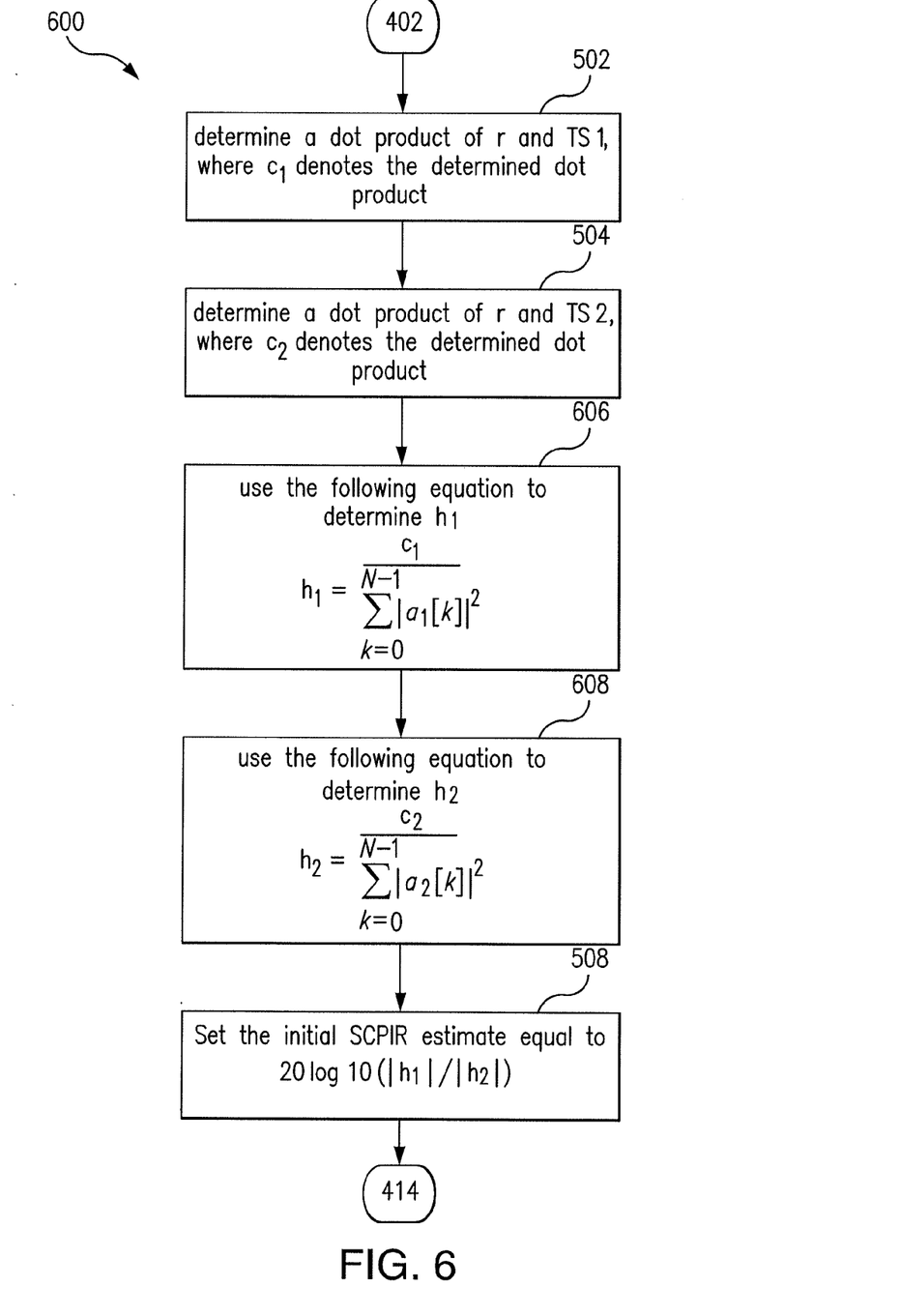

Referring now to FIG. 6, FIG. 6 is a flow chart illustrating a process 600, according to another embodiment, for performing steps 408-412 of process 400. In this embodiment, it is assumed that TS1 and TS2 are orthogonal. Process 600 may being with steps 502 and 504 (see above). In steps 606 and 608, SCPIR estimator 206 determines $h_1$ and $h_2$ using the following equations, respectively:

$$h_1 = \frac{c_1}{\sum_{k=0}^{N-1} |a_1[k]|^2}$$

and $$h_2 = \frac{c_2}{\sum_{k=0}^{N-1} |a_2[k]|^2}$$

Next, SCPIR estimator performs step 508, thereby establishing the initial SCPIR estimate.

In another embodiment, $h_1$ and $h_2$ are determined using the following equation:

$$\begin{bmatrix} h_1 \\ h_2 \end{bmatrix} = [([A_1 | A_2]^H [A_1 | A_2])^{-1} [A_1 | A_2]^H] r.$$

In yet another embodiment, $h_1$ and $h_2$ are determined using the following equations: $h_1 = ((A_1^H A_1)^{-1} A_1^H) r$, and $h_2 = ((A_2^H A_2)^{-1} A_2^H) r$. In still another embodiment, $h_1$ and $h_2$ are determined using the following equations: $h_1 = ((A_1^H A_1)^{-1} A_1^H) r$, and $h_2 = ((A_2^H A_2)^{-1} A_2^H)(r - (A_1 h_1))$. In each of these three embodiments the CIRs (i.e., $h_1$ and $h_2$) are of length K, where K>1. Also, in each of these three embodiments, the initial SCPIR estimate (see step 412) is set equal to:

$$20 \log 10 \left( \frac{1}{K} \sum_{k=0}^{K-1} |h_1[k]|/|h_2[k]| \right).$$

In these embodiments, one may determine which of the two subchannels is stronger by comparing the energy of $h_1$ (the CIR for the first subchannel) with the energy of $h_2$ (the CIR for the second subchannel). For example, if we let $e_1$ denote the energy of $h_1$ and we let $e_2$ denote the energy of $h_2$ then we can compute $e_1$ and $e_2$ using the following equation:

$$e_n = \sum_{k=0}^{K-1} |h_n[k]|^2$$

for n=1,2, and then compare $e_1$ with $e_2$. If $e_1$ is greater than $e_2$, then the first subchannel should be designated as the stronger subchannel, otherwise the second subchannel should be designated as the stronger subchannel.

Figure 7:
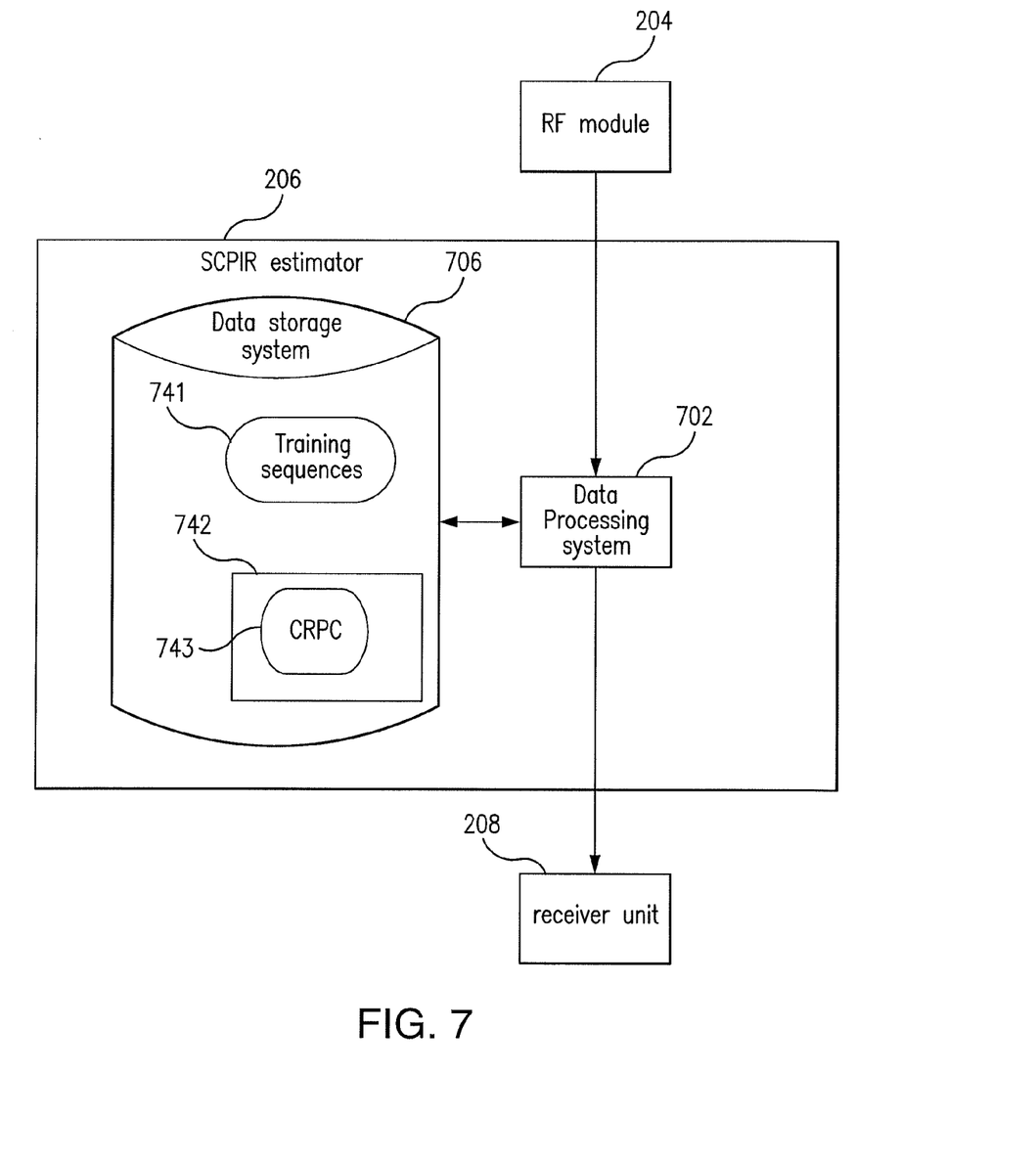
FIG. 7 is a block diagram of a particular embodiment of a data processing system for use in a communication device.

Referring now to FIG. 7, FIG. 7 illustrates a block diagram of SCPIR estimator 206 according to some embodiments of the invention. As shown in FIG. 7, SCPIR estimator 206 may include a data processing system 702, which may include one or more microprocessors and/or one or more circuits, such as an application specific integrated circuit (ASIC), Field-programmable gate arrays (FPGAs), etc; and a data storage system 706, which may include one or more non-volatile storage devices and/or one or more volatile storage devices (e.g., random access memory (RAM)). As shown, data storage system 706 may store training sequences (e.g., a set of training sequence pairs, such as, TS1 and TS2 described above). In embodiments where data processing system 702 includes a microprocessor, computer readable program code 743 may be stored in a computer readable medium 742, such as, but not limited, to magnetic media (e.g., a hard disk), optical media (e.g., a DVD), memory devices (e.g., random access memory), etc. In some embodiments, computer readable program code 743 is configured such that when executed, code 743 causes SCPIR estimator 206 to perform steps described above (e.g., steps describe above with reference to the flow charts shown in FIGS. 3-6). In other embodiments, SCPIR estimator 206 is configured to perform steps described above without the need for code 743. That is, for example, data processing system 702 may consist merely of one or more ASICs. Hence, the features of the present invention described above may be implemented in hardware and/or software. For example, in particular embodiments, the functional components of SCPIR estimator 206 described above may be implemented by data processing system 702 executing computer instructions 743, by data processing system 702 operating independent of any computer instructions 743, or by any suitable combination of hardware and/or software.

Figure 8:
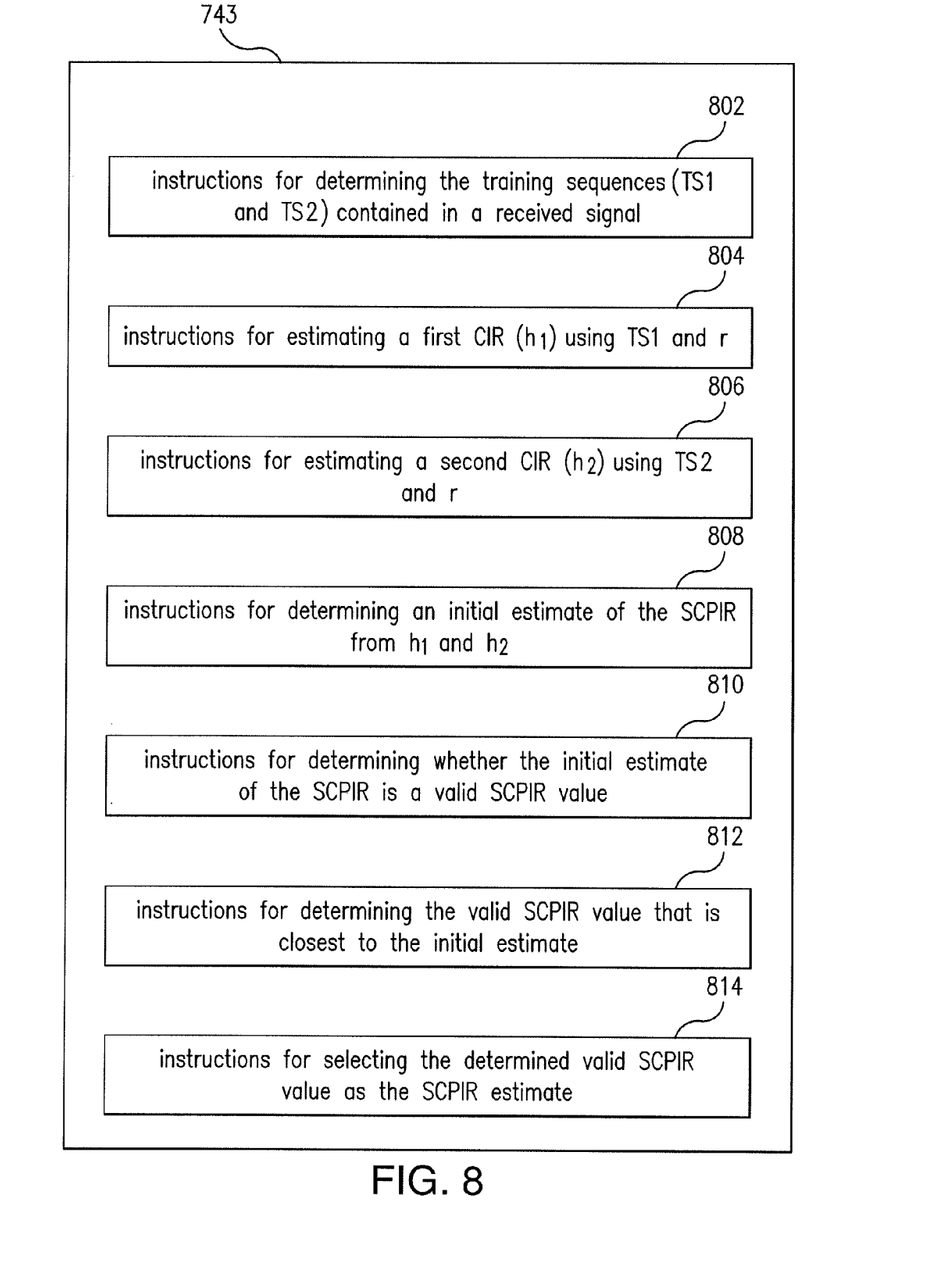
FIG. 8 is a block diagram illustrating example software components of a communication device.

Referring now to FIG. 8, FIG. 8 illustrates an embodiment of computer readable program code (CRPC) 743. In the embodiment shown, CRPC 743 includes: (1) a set of instructions 802 for determining the training sequences (TS1 and TS2) contained in a received signal, (2) a set of instructions 804 for estimating a first CIR ($h_1$) using TS1 and r, (3) a set of instructions 806 for estimating a second CIR ($h_2$) using TS2 and r, (4) a set of instructions 808 for determining an initial estimate the SCPIR from $h_1$ and $h_2$, (5) a set of instructions 810 for determining whether the initial estimate of the SCPIR is a valid SCPIR value, (6) a set of instructions 812 for determining the valid SCPIR value that is closest to the initial estimate, and (7) a set of instructions 814 for selecting the determined valid SCPIR value as the SCPIR estimate.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a communication device for estimating a subchannel power imbalance ratio (SCPIR) between a pair of subchannels consisting of a first subchannel and a second subchannel, the method comprising:

receiving at the communication device a modulated signal, the modulated signal comprising a first signal intended for the communication device and a second signal intended for another communication device, the first signal comprising a first training sequence (TS1) and the second signal comprising a second training sequence (TS2) that is paired with TS1;

producing from the received modulated signal a sample sequence (r);

using TS1 and r to estimate a channel impulse response of length K for the first subchannel, where $h_1$ denotes the estimated channel impulse response for the first subchannel and K is greater than or equal to 1;

using TS2 and r to estimate a channel impulse response of length K for the second subchannel, where $h_2$ denotes the estimated channel impulse response for the second subchannel; and estimating the SCPIR from $h_1$ and $h_2$.

2. The method of claim 1, wherein K is equal to 1.

3. The method of claim 2, wherein the step of determining $h_1$ comprises determining a dot product of r and TS1, where $c_1$ denotes the determined dot product, and the step of determining $h_2$ comprises determining a dot product of r and TS2, where $c_2$ denotes the determined dot product.

4. The method of claim 3, wherein
$c_1$ is determined using the following equation:

$$c_1 = \sum_{k=0}^{N-1} a_1^*[k]r[k],$$

and
$c_2$ is determined using the following equation:

$$c_2 = \sum_{k=0}^{N-1} a_2^*[k]r[k],$$

and
$a_1$ represents TS1, $a_2$ represents TS2, r[k] is the kth value of sequence r, and N is the length of the TS1, which is equal to the length of TS2.

5. The method of claim 3, wherein $h_1$ and $h_2$ are determined using the following equation:

$$\begin{bmatrix} h_1 \\ h_2 \end{bmatrix} = D \begin{bmatrix} c_1 \\ c_2 \end{bmatrix},$$

where D is a matrix that allows combined energy estimation for the two subchannels.

6. The method of claim 3, wherein
$h_1$ is determined using the following equation:

$$h_1 = \frac{c_1}{\sum_{k=0}^{N-1} |a_1[k]|^2}$$

and
$h_2$ is determined using the following equation:

$$h_2 = \frac{c_2}{\sum_{k=0}^{N-1} |a_2[k]|^2}$$

7. The method of claim 2, wherein the step of estimating the SCPIR comprises computing $20 \log 10(|h1|/|h2|)$.

8. The method of claim 7, wherein a set of valid SCPIR values is defined and the method further comprises:
   setting an initial estimate of the SCIPR to the value obtained by computing $20 \log 10(|h1|/|h2|)$;
   determining whether the initial estimate of the SCPIR is equal to one of the valid SCPIR values; and
   if it is determined that the initial estimate of the SCPIR is not equal to one of the valid SCPIR values, then determining the valid SCPIR value that is closest in value to the initial estimate and choosing this valid SCPIR value as the estimate of the SCPIR.

9. The method of claim 1, wherein $h_1$ is a column vector having a length of K and $h_2$ is a column vector having a length of K, where K is greater than one.

10. The method of claim 9, wherein the step of estimating the SCPIR comprises setting an initial estimate of the SCPIR equal to $$20 \log 10\left(\frac{1}{K}\sum_{k=0}^{K-1} |h_1[k]|/|h_2[k]|\right).$$

11. The method of claim 9, wherein $h_1$ and $h_2$ are determined using the following equation:

$$\begin{bmatrix} h_1 \\ h_2 \end{bmatrix} = A\ r,$$

where $A=([A_1|A_2]^H[A_1|A_2])^{-1}[A_1|A_2]^H$.

12. The method of claim 9, wherein
$h_1$ equals $((A_1^H A_1)^{-1} A_1^H)r$, and
$h_2$ equals $((A_2^H A_2)^{-1} A_2^H)r$.

13. The method of claim 9, wherein
$h_1$ equals $((A_1^H A_1)^{-1} A_1^H)r$, and
$h_2$ equals $((A_2^H A_2)^{-1} A_2^H)(r-(A_1 h_1))$.

14. A communication device, comprising:
   an RF module for receiving a carrier signal on which two bit streams, a first bit stream intended for the communication device and a second bit stream intended for another communication device, are modulated and for producing a sample sequence (r) from the received carrier signal, wherein the first bit stream includes a first training sequence (TS1) and the second bit stream includes a second training sequence (TS2) that is paired with TS1; and a subchannel power imbalance ratio (SCPIR) estimator for estimating a ratio of the power used to transmit the first bit stream and the power used to transmit the second bit stream, the SCPIR estimator being configured to:
   use TS1 and r to estimate a channel impulse response of length K for a first subchannel, where $h_1$ denotes the estimated channel impulse response for the first subchannel and K is greater than or equal to 1;
   use TS2 and r to estimate a channel impulse response of length K for a second subchannel, where $h_2$ denotes the estimated channel impulse response for the second subchannel; and
   estimate the ratio from $h_1$ and $h_2$.

15. The communication device of claim 14, wherein
   the SCPIR estimator is configured to determine $h_1$ by determining a dot product of r and TS1, where $c_1$ denotes the determined dot product, and
   the SCPIR estimator is configured to determine $h_2$ by determining a dot product of the r and TS2, where $c_2$ denotes the determined dot product.

16. The communication device of claim 15, wherein the SCPIR estimator is configured to determine $h_1$ and $h_2$ by using the following equation:

$$\begin{bmatrix} h_1 \\ h_2 \end{bmatrix} = D\begin{bmatrix} c_1 \\ c_2 \end{bmatrix},$$

where D is a matrix that allows combined energy estimation for the two subchannels.

17. The communication device of claim 16, wherein
   the SCPIR estimator is configured to determine $h_1$ by using the following equation:

$$h_1 = \frac{c_1}{\sum_{k=0}^{N-1} |a_1[k]|^2}$$

and
   the SCPIR estimator is configured to determine $h_2$ by using the following equation:

$$h_2 = \frac{c_2}{\sum_{k=0}^{N-1} |a_2[k]|^2}$$

18. The communication device of claim 14, wherein
   $h_1$ is a column vector having a length of K and $h_2$ is a column vector having a length of K, where K is greater than one, and
   the SCPIR estimator is configured to estimate the ratio by setting an initial estimate of the ratio equal to $$20 \log 10\left(\frac{1}{K}\sum_{k=0}^{K-1} |h_1[k]|/|h_2[k]|\right).$$

19. The communication device of claim 10, wherein the SCPIR estimator is configured to determine $h_1$ and $h_2$ by using the following equation:

$$\begin{bmatrix} h_1 \\ h_2 \end{bmatrix} = A\ r, \text{ where } A = \left([A_1|A_2]^H [A_1|A_2]\right)^{-1} [A_1|A_2]^H.$$

20. The communication device of claim 10, wherein
the SCPIR estimator is configured to $h_1$ by using the following equation: $h_1 = ((A_1^H A_1)^{-1} A_1^H) r$, and
the SCPIR estimator is configured to $h_2$ by (a) using the following equation: $h_2 = ((A_2^H A_2)^{-1} A_2^H) r$ or (b) by using the following equation: $h_2$ equals $((A_2^H A_2)^{-1} A_2^H)(r - (A_1 H_1))$.

* * * * *

UNITED STATES PATENT AND TRADEMARK OFFICE
CERTIFICATE OF CORRECTION

PATENT NO. : 8,682,251 B2
APPLICATION NO. : 13/099777
DATED : March 25, 2014
INVENTOR(S) : Das et al.

It is certified that error appears in the above-identified patent and that said Letters Patent is hereby corrected as shown below:

In the Specification

In Column 4, Line 2, delete "$h_1=((A_1^A A_1)^{-1} A_1^H)r$," and insert -- $h_1=((A_1^H A_1)^{-1} A_1^H)r$, --, therefor.

In Column 5, Line 22, delete "an output device" and insert -- an output device 222 --, therefor.

In Column 6, Line 62, in Equation (3), delete "$r=A_1 h+jLA_2 h+v+w$" and insert -- $r=A_1 h+jbA_2 h+v+w$ --, therefor.

In the Claims

In Column 11, Line 22, in Claim 8, delete "SCIPR" and insert -- SCPIR --, therefor.

In Column 13, Line 7, in Claim 19, in Equation, delete "$A = ([A_1|A_2]^H [A_1|A_2])^{-1} [A_1|A_2]^H$." and insert -- $A = ([A_1|A_2]^H [A_1|A_2])^{-1} [A_1|A_2]^H$. --, therefor.

Signed and Sealed this
Twenty-second Day of July, 2014

Michelle K. Lee
*Deputy Director of the United States Patent and Trademark Office*